United States Patent [19]

Gahagan et al.

[11] Patent Number: 4,669,089
[45] Date of Patent: May 26, 1987

[54] SUPPRESSED CLOCK PULSE-DURATION MODULATOR FOR DIRECT SEQUENCE SPREAD SPECTRUM TRANSMISSION SYSTEMS

[75] Inventors: Dean A. Gahagan, Kent; Kenneth Y. Ogami, Bothell, both of Wash.

[73] Assignee: The Boeing Company, Seattle, Wash.

[21] Appl. No.: 781,936

[22] Filed: Sep. 30, 1985

[51] Int. Cl.[4] ............................................. H04K 1/00
[52] U.S. Cl. ......................................... 375/1; 375/22; 380/34; 380/44
[58] Field of Search ....................... 375/1, 2.2, 2.1, 22, 375/115; 178/22.01, 22.13, 22.17, 22.19; 455/28, 30; 370/107, 8

[56] References Cited

U.S. PATENT DOCUMENTS

| | | | |
|---|---|---|---|
| 3,305,636 | 2/1967 | Webb | 375/1 |
| 3,439,279 | 4/1969 | Guanella | 328/63 |
| 3,666,889 | 5/1972 | Zegers et al. | 179/15 BM |
| 4,001,728 | 1/1977 | Schneider | 332/1 |
| 4,112,368 | 9/1978 | Ewanus et al. | 325/32 |
| 4,171,513 | 10/1979 | Otey et al. | 325/32 |
| 4,467,319 | 8/1984 | Uchikoshi | 340/347 |
| 4,502,024 | 2/1985 | Nishikawa et al. | 332/9 |
| 4,527,275 | 7/1985 | Russell | 375/1 |

FOREIGN PATENT DOCUMENTS 56-149151  11/1981  Japan .

OTHER PUBLICATIONS

*Spread Spectrum Systems*, R. C. Dixon, pp. 1–12, 121–123 and 160; (Published by John Wiley & Sons, 1976).

Primary Examiner—Robert L. Griffin
Assistant Examiner—Stephen Chin
Attorney, Agent, or Firm—Christensen, O'Connor, Johnson & Kindness

[57] ABSTRACT

In the disclosed digital circuit, a digital direct sequence modulation signal is converted to a suppressed clock pulse-duration modulation signal to thereby suppress the clock feature in the frequency spectra of a spread spectrum transmission system. The disclosed digital circuit includes a parallel output shift register for converting the direct sequence modulation signal to a corresponding series of four-bit digital words. The digital words supplied by the shift register are loaded into a four-bit synchronous binary counter circuit. The counter circuit counts upwardly from the value of the digital word and supplies a carry pulse to a logic circuit which, in turn, produces an output pulse, the duration of which is representative of value of the digital word supplied by the shift register. The pulse-duration modulation signal supplied by the logic circuit is modulo-2 added with a signal having one-half the clock rate of the information embedded in the direct sequence modulation signal to supply the suppressed clock pulse-duration modulation signal.

10 Claims, 8 Drawing Figures

SUPPRESSED CLOCK PULSE-DURATION MODULATOR FOR DIRECT SEQUENCE SPREAD SPECTRUM TRANSMISSION SYSTEMS

BACKGROUND OF THE INVENTION

This invention relates to direct sequence modulated spread spectrum transmission systems. More specifically, this invention relates to digital circuitry for suppressed clock pulse-duration modulation in direct sequence modulated spread spectrum systems.

As is known in the art, in a spread spectrum transmission system, a signal or operation other than the information being sent is used for broadbanding the transmitted signal. Thus, in a spread spectrum system, the transmitted information is literally spread over a frequency range that is much wider than the minimum bandwidth required to transmit that information. Because of the low-density power spectra of the transmitted signal, and the ability of such systems to operate reliably with signal-to-noise ratios substantially less than unity, spread spectrum transmission systems can be used as secure communication systems in which the transmitted signal in effect is hidden in background noise that results from atmospheric and other natural causes as well as other transmission systems.

One type of modulation that can be employed in a spread spectrum communication is known as "direct sequence modulation." In a digital circuit direct sequence modulated spread spectrum system, the carrier signal is modulated by a digital information signal and by a digital code sequence that exhibits a bit rate that is substantially higher than the rate at which digital information is made available to the system. In many such systems, the digital code sequence is a pseudo-random binary code sequence that is pulse code modulated at a predetermined clock rate. In particular, direct sequence spread spectrum systems often utilize conventional circuit arrangements that are commonly identified as pseudo-noise generators which are responsive to an applied periodic clock signal and produce a pseudo-random binary sequence in a pulse code modulated format. In most cases, the information to be transmitted is combined with the binary code sequence by modulo-2 addition that is effected prior to modulating the system carrier signal. Thus, the direct sequence modulation signal is a pulse code modulated digital signal having a clock frequency equal to the clock frequency of the pseudo-noise generator. When the carrier signal is modulated with the data-embedded pseudo-noise code, the information can readily be recovered by a receiver that demodulates the received signal and correlates the demodulated signal with a reference signal that is synchronized to and is identical to the pseudo-random binary sequence utilized in the spectrum.

Although direct sequence spread spectrum systems of the above-described type exhibit a low-density power spectra (i.e., the power transmitted is relatively low in any narrow frequency band), such a system often does not provide the desired degree of security relative to detection and interception of the coded transmission. In particular, the power spectra of both the direct sequence modulation signal and the modulated carrier signal exhibit a $(\sin x/x)^2$ envelope in which the main lobe of the envelope exhibits a bandwidth (null-to-null) equal to twice the pseudo-noise generator clock rate and each side lobe of the envelope exhibits a bandwidth that is equal to the pseudo-noise generator clock rate.

Thus, by utilizing a narrow band receiver that is continuously tuned (swept) to search the frequency spectra, it is possible for unauthorized persons to detect the transmission of a direct sequence modulated signal and to determine the clock rate of the system pseudo-noise generator. In spread spectrum systems of the type intended to "hide" the fact that a signal is being transmitted, detection of the $(\sin x/x)^2$ feature can severely limit the effectiveness of the system. Further, in some applications, detection of the system clock rate by an unauthorized receiver can lead to either interception of the transmitted information or permit the intercepting party to generate a jamming signal at the system clock rate of sufficient power density to temporarily disable the associated navigation or communication system.

A solution to the above-discused drawback has been proposed relative to spread spectrum systems in which the information to be transmitted is supplied to the system in analog signal format. More specifically, in a signal processing technique that is referred to as suppressed clock pulse-duration modulation, an analog input signal (the information to be transmitted) is supplied to a sample-and-hold circuit that is clocked at a rate that is substantially higher than the highest frequency component of the input signal. The output of the sample-and-hold circuit is supplied to one input terminal of a comparator circuit having the second input terminal thereof connected for receiving a signal supplied by a ramp generator that is synchronized with the sample-and-hold circuit. Since the signal comparator changes states when the value of the ramp signal exceeds the signal level stored in the sample-and-hold circuit, the signal supplied by the comparator is a pulse-duration modulated signal, with the length of each pulse ranging between zero and the clock period and being dependent upon the current value of the sampled signal. Since the ramp generator is synchronized to the sample-and-hold circuit, the pulse-duration modulation signal generated by the comparator circuit is synchronous with the clock signal, i.e., one edge of each pulse of the pulse-duration modulation signal is coincident in time with the falling edge of the ramp signal. To eliminate the clock feature from the pulse-duration modulation signal, the output of the comparator circuit is connected to a modulo-2 adder, which also is supplied with a periodic signal that is generated by dividing the clock signal by two. The modulo-2 addition, in effect, subtracts the clock signal from the pulse-duration modulated data stream provided by the comparator circuit thus, embedding the information to be transmitted in a signal that exhibits one-half the circuit sampling rate (clock rate). To restore the pulse-duration modulated signal within the system receiver, the suppressed clock-pulse-duration modulated signal is modulo-2 added with a square wave that is synchronized to and operates at one-half the clock rate of the clock circuit that controls the sample-and-hold circuit and ramp generator of the system transmitter.

The above-described suppressed clock pulse-duration modulation technique is not directly applicable to digital direct sequence modulated spread spectrum systems since the direct sequence modulation signal is a binary code sequence that cannot be supplied to the sample-and-hold circuit in place of the analog input signal. Moreover, satisfactory clock suppression generally cannot be obtained by converting the direct sequence modulation signal to an analog signal and applying that analog signal to a suppressed clock pulse-duration modulation circuit of the above-described type. In particular, time delays that are primarily attributable to the fall-time of the ramp generator and the settling time of conventional digital-to-analog converter circuits cause the comparator circuit to provide a pulse-duration modulation signal that is delayed in time relative to the system clock signal. Because of this time delay, the clock signal is not entirely suppressed when the delayed pulse-duration modulation signal is modulo-2 added with a signal that is synchronized to and operates at one-half the digital-to-analog conversion rate. Although the degree of clock suppression that can be attained by first converting the direct sequence modulation signal to an analog signal and processing that analog signal with a prior art suppressed clock pulse-duration modulation circuit might be improved to some degree at the expense of increased circuit complexity, such a trade-off generally is not satisfactory. Moreover, in such an arrangement, the maximum rate at which the circuit can be clocked is determined by the operating capabilities of the ramp generator and the digital-to-analog converter. In many cases, the maximum rate at which such a circuit can be clocked will not provide the desired degree of spectrum-spreading.

Thus, a need exists for suppressed clock pulse-duration modulation techniques and circuitry that can be employed with digital direct sequence modulation spectrum-spreading communication systems to thereby eliminate the clock information from the transmitted signal and thus further reduce the probability that the transmitted signal will be detected or intercepted by electronic surveillance receivers and/or other electronic countermeasures equipment.

SUMMARY OF THE INVENTION

In accordance with the invention, a digital direct sequence modulation signal that includes a digital data signal embedded in a binary code sequence (a pseudo-noise signal) that is clocked at N times the clock rate of the digital data is converted to a suppressed clock pulse-duration modulation signal by synchronous sequential signal processing wherein:

(a) a pulse-duration modulation signal is generated in synchronization with the clock rate of the binary code sequence, with each signal pulse having a pulse width that represents the equivalent value for a corresponding set of N consecutive bits of the digital direct sequence modulation signal; and (b) the pulse-duration modulation signal obtained in step (a) is modulo-2 added with a signal which is synchronized with the digital data signal and which exhibits one-half the clock rate of the digital data signal. In accordance with the disclosed embodiments of the invention, the sequential synchronous signal processing that is used to generate the pulse-duration modulation signal involves:

(a) partitioning the digital direct sequence signal into a series of consecutive N-bit digital words;

(b) counting from the binary value of each N-bit word to a value of $2^N$ at a counting rate of $2^N/N\,T$, where T is the clock period of the binary code sequence; and, (c) producing a pulse of a width equal to the time required to count from the binary value of the N-bit digital word to a value of $2^N$.

In the disclosed digital circuit realization of the invention, the digital direct sequence is coupled to the input terminal of a parallel output serial shift register having the output terminals thereof connected to the data input terminals of a synchronous binary counter. The parallel data established by the shift register is loaded into the counter circuit, which then counts upwardly until the counter reaches maximum count (a carry pulse is generated). A J-K flipflop, which is set when the count sequence begins (counter loaded) and is reset when the counter generates a carry pulse, produces a signal having a pulse width which is dependent upon the value of the data loaded into the counter and, hence, a pulse-duration modulated signal. This signal is then modulo-2 added with a signal having a clock rate that is equal to one-half the digital data clock rate to thereby produce the suppressed clock pulse-duration modulation signal.

In the disclosed realization of the invention, the digital direct sequence is derived from a pseudo-noise generator that operates at a clock rate that is four times the clock rate of the digital data generator. Thus, in the disclosed embodiment, N is equal to 4, and a four-bit shift register and a four-bit binary counter are utilized with the counter being clocked at a rate that is four times the clock rate of the pseudo-noise generator. This causes the counter to provide four counts for each data bit of the digital data sequence and, thus, a pulse-duration modulation signal in which the duration of each pulse is between one and 16 counter counts (depending upon the value of the four-bit data word supplied by the shift register). To load the parallel data generated by the shift register into the counter in advance of the 16-count interval during which a pulse of the pulse-duration modulation signal is produced, the disclosed embodiment includes a timing circuit that supplies:

(a) a synchronized clock signal at one-half the clock rate of the counter circuit;

(b) a synchronized clock signal at one-fourth the clock rate of the counter circuit (equal to the pseudo-noise generator clock rate);

(c) a synchronizd clock signal at one-eighth the counter clock rate; and (d) a synchronized clock signal at one-sixteenth the counter clock rate (equal to the data generator clock rate).

The four clock signals are coupled to the input terminals of a four-input NOR gate, which produces a single signal pulse for each set of 16 counter-clock pulses. This signal pulse is coupled to the counter load terminal to start each 16-count interval that supplies one pulse of the pulse-duration modulation signal (by initializing the counter count equal to the value of the four-bit word stored in the shift register) and, in addition, is utilized to set the Q output of a J-K flip-flop. The counter circuit then counts from the value of the four-bit parallel signal. When a count of 16 is reached, a carry signal is generated and is coupled to the K input terminal of the J-K flip-flop to reset the Q output and terminate the pulse of the pulse-duration modulation signal.

To suppress the clock signal in the output signal of the disclosed embodiment, the Q output terminal of the J-K flip-flop is coupled to one input terminal of a modulo-2 adder. The second input terminal of the modulo-2 adder is connected for receiving a signal that is generated by the timing circuit of the disclosed embodiment at a clock rate that is equal to the counter clock rate divided by 32 (i.e., one-half the data generator clock rate).

BRIEF DESCRIPTION OF THE DRAWING

These and other features and advantages of the invention will be more readily understood in view of the following detailed description, taken in conjunction with the accompanying figures, wherein.

DETAILED DESCRIPTION

Figure 1:
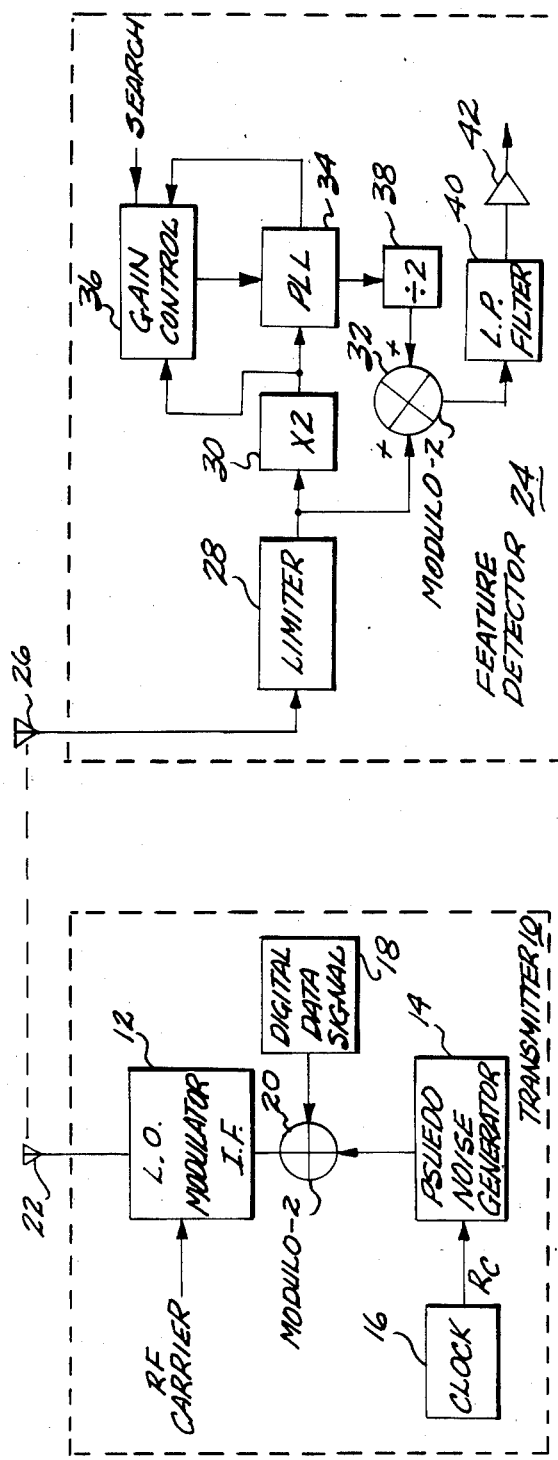
FIG. 1 is a block diagram of a conventional direct sequence spread spectrum transmitter and a receiver that can be used to detect the presence of transmission by such a transmitter.

FIG. 1 is a block diagram that depicts the basic structure of a conventional direct sequence spread spectrum communication system. In FIG. 1, a transmitter 10 includes a modulator 12 that modulates an RF carrier signal with a pseudo-noise direct sequence modulation signal. The pseudo-noise direct sequence modulation signal is provided by a pseudo-noise generator 14 that is periodically clocked by a clock circuit 16 so that pseudonoise generator 14 supplies a pulse code modulated binary code sequence. The information to be transmitted is supplied by a digital data signal generator 18 at a rate that is synchronized to and substantially less than the clock rate of clock 16, with the digital data signal being embedded in the pseudo-noise signal by modulo-2 addition in an adder circuit 20. The output of adder circuit 20 is coupled to the IF port of modulator 12, which supplies the pulse code modulated direct sequence spectro spread signal to an antenna 22.

Figure 2:
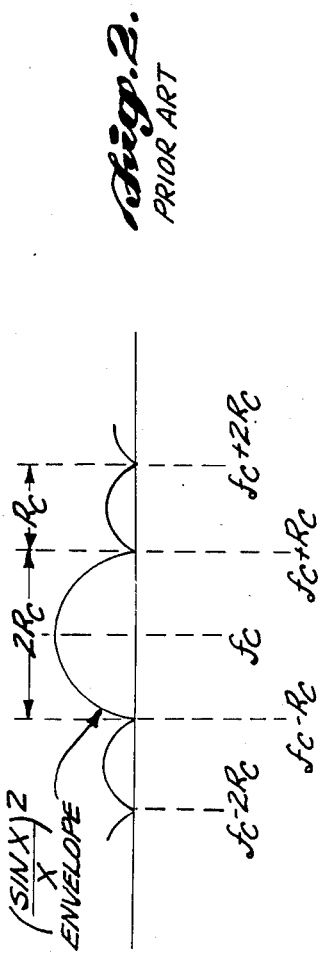
FIG. 2 illustrates the typical output spectra of a direct sequence spread spectrum system of the type illustrated in FIG. 1.

Referring to FIG. 2, it can be noted that the output spectra of transmitter 10 exhibits a $(\sin x/x)^2$ envelope that is symmetric about the carrier frequency ($f_c$). As is indicated in FIG. 2, the bandwidth of the main lobe is equal to two times the direct sequence spread spectrum system clock rate (clock 16 in FIG. 1) and the bandwidth of each side lobe is equal to the system clock rate. The $(\sin x/x)^2$ feature of the system output spectra can be detected by unauthorized parties by means of various techniques such as feature detector 24 of FIG. 1.

As is indicated in FIG. 1, feature detector 24 includes an antenna 26, which couples the received signals to a limiter 28, which squares the input waveform. The output signal supplied by limiter 28 is coupled to a frequency doubler 30 in one input terminal of a modulo-2 adder 32. A phase-locked loop 34, having a gain control unit 36 that establishes the phase-locked frequency, is connected for receiving the output signal supplied by frequency multiplier 30. Thus, when a tuning or search signal is supplied to gain control unit 36, phase-locked loop 34 locks to a frequency equal to twice the system clock frequency of the spread spectrum system which generated the signal being received (e.g., transmitter 10). A divide-by-two frequency divider 38 restores the phase-locked loop signal to the clock rate of the direct sequence spread spectrum transmitter 10 and supplies the signal to the second input terminal of the modulo-2 adder 32. The output signal supplied by modulo-2 adder 32 is processed by a low-pas filter 40 and amplified in an amplifier 42 to obtain the baseband pseudo-noise code sequence of transmitter 10.

Figure 3:
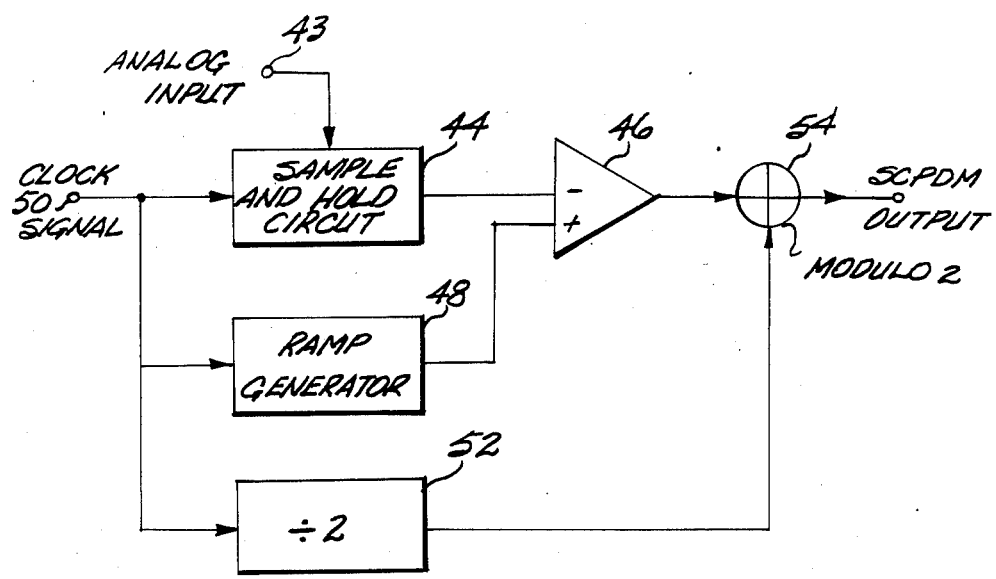
FIG. 3 depicts a prior art suppressed clock pulse-duration modulation circuit that is applicable to spread spectrum systems in which the information to be transmitted is an analog signal.

One method of eliminating the $(\sin x/x)^2$ output spectra envelope of a spread spectrum transmission system in which the information to be transmitted is an analog signal (e.g., voice) is disclosed in *Spread Spectrum Systems*, R. C. Dixon, John Wiley & Sons, 1976, pages 121-123. A circuit for realizing this technique, which is known as suppressed clock pulse-duration modulation is illustrated in FIG. 3. In the depicted arrangement, the analog signal to be transmitted is applied to the input terminal of a sample-and-hold circuit 44 via an input terminal 43. The output of sample-and-hold circuit 44 is connected to one input terminal of a comparator circuit 46, which has the second input terminal connected to the output terminal of a ramp generator 48. A clock signal, which is applied to terminal 50 in the arrangement of FIG. 3, clocks both sample-and-hold circuit 44 and ramp generator 48 so that the ramp signal that is applied to comparator 46 is synchronous with the data samples provided by sample-and-hold circuit 44. In addition, the clock signal is coupled to one input terminal of a modulo-2 adder 54 via a divide-by-two frequency divider 52. The second input terminal of modulo-2 adder 54 is connected for receiving the signal provided by comparator 46.

Figure 4:
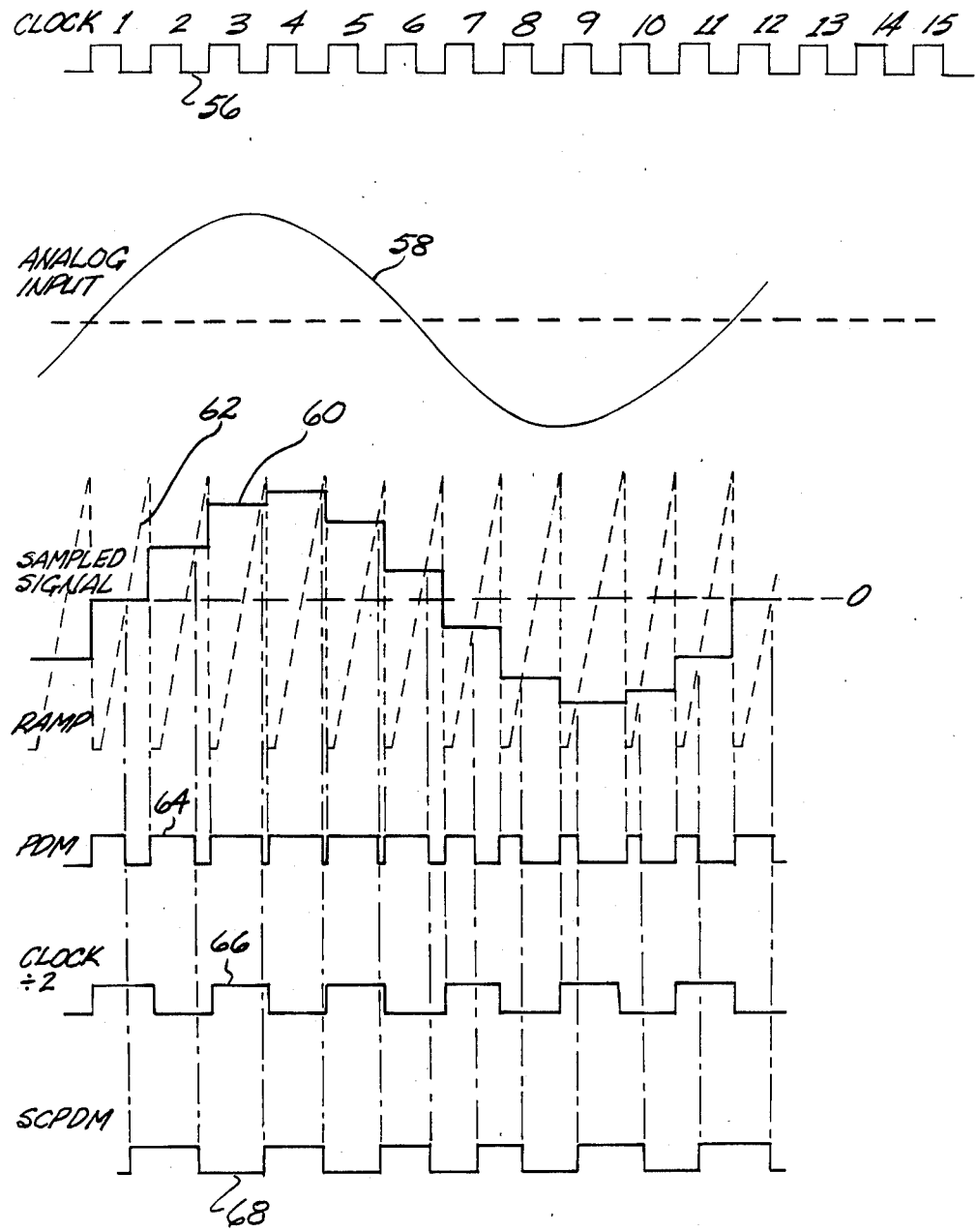
FIG. 4 is a timing diagram that is useful in understanding the manner in which the prior art circuit arrangement of FIG. 3 operates to generate a suppressed clock pulse-duration modulation signal.

The operation of the suppressed clock pulse-duration modulator of FIG. 3 can be understood with reference to FIG. 4, which illustrates the signals present at each circuit node of FIG. 3 when a substantially sinusoidal analog input signal is applied to terminal 43. As is indicated in FIG. 4, the periodic clock signal (identified by the numeral 56) causes the sample-and-hold circuit 44 to generate a signal 60 that is a staircase approximation to the analog input signal 58. Since the ramp signal (62 in FIG. 4) and the sampled data signal 60 are synchronized and provide the input to comparator 46 of FIG. 3, it can be recognized that the comparator changes states when ramp signal 62 exceeds the sample data signal 60. Thus, when sinusoid 58 is applied to the analog input terminal 43, comparator 46 produces the pulse-duration modulation signal (PDM signal) 64 of FIG. 4. It can be noted that the leading (rising) edge of each signal pulse in PDM signal 64 is synchronized to the falling edge of ramp signal 62.

As is known in the art, the operation of module-2 addition corresponds to the Exclusive OR logic operation. Thus, modulo-2 addition of PDM signal 64 with a signal having one-half the pulse repetition rate of clock signal 56 (i.e., signal 66 of FIG. 4) results in the suppressed clock pulse-duration modulation signal 68 of FIG. 4. As can be seen in FIG. 4, the clock feature is suppressed because the leading and trailing edges of the suppressed clock pulse-duration modulation signal 66 coincide with the trailing edges of PDM signal 64 but do not coincide with either the leading or trailing edges of the clock signal.

Although it might appear that the suppressed clock pulse-duration modulation circuit of FIG. 3 easily can be utilized in a digital direct sequence spread spectrum system by converting the digital pseudo-noise direct sequence signal to an analog signal and processing that analog signal with the circuit of FIG. 3, certain disadvantages and drawbacks are encountered. Firstly, the digital-to-analog converter and the ramp generator often cannot be clocked at a rate that provides the desired system arrangement. Secondly, in such a circuit, the settling time of the digital-to-analog converter and the fall time of the ramp generator cause the pulse-duration modulation signal (64 in FIG. 4) to be delayed. When a delayed pulse-duration modulation signal is modulo-2 added with the divide-by-two clock signal, the clock signal is not totally removed from the suppressed clock pulse-duration modulation signal.

Figure 5:
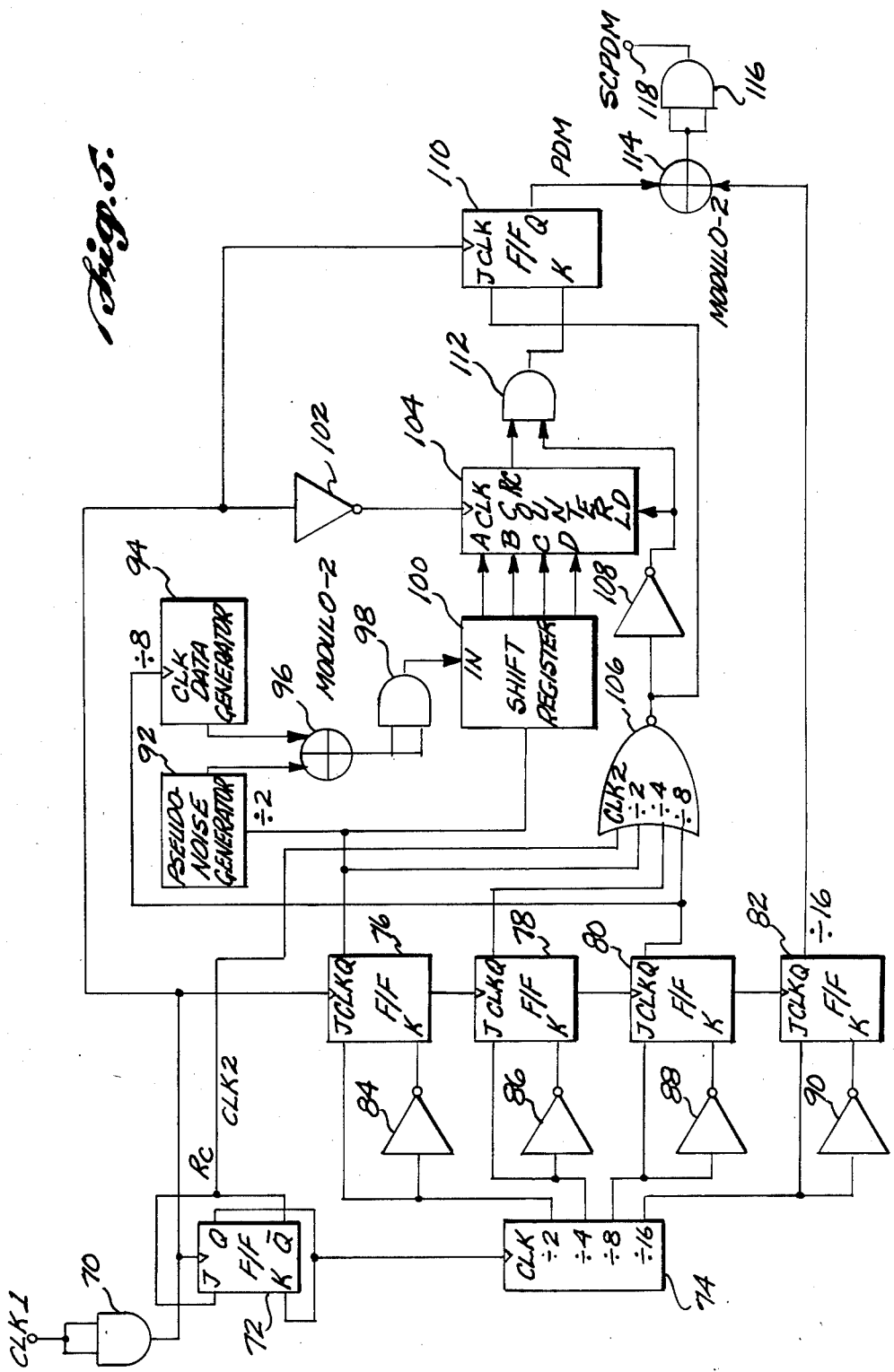
FIG. 5 depicts a digital circuit arrangement constructed in accordance with the invention for generating a suppressed clock pulse-duration modulation signal for use in direct sequence spread spectrum transmission systems.

FIG. 5 illustrates a digital circuit suppressed clock pulse-duration modulation circuit constructed in accordance with the invention. In FIG. 5, the system clock signal (denoted as CLK 1) is supplied to an AND gate 70 having the input terminals thereof commonly connected so that AND gate 70 funtions as a buffer or driver circuit. The clock signal supplied by AND gate 70 is connected to the clock terminals of J-K flip-flop 72 having the J terminal connected to the $\overline{Q}$ output terminal and the K terminal connected to the Q output terminal so that flip-flop 72 serves as a divide-by-two circuit. A frequency divider 74 is clocked from the Q output of flip-flop 72 (identified as the CLK 2 signals in FIG. 5), with frequency divider 72 providing signal at one-half, one-fourth, one-eighth and one-sixteenth of the repetition rate of the signal supplied by flip-flop 72 (respectively identified as the ÷2 clock signal, the ÷4 clock signal, the ÷8 clock signal and the ÷16 clock signal in FIG. 5). Each of the ÷2 clock, ÷4 clock, ÷8 clock and ÷16 clock signals are directly connected to the J terminal of an associated flip-flop (76, 78, 80 and 82, respectively) and is coupled to the K terminal of the associated flip-flop via an associated inverter 84, 86, 88 and 90. With flip-flop 76, 78, 80 and 82 and inverters 84, 86, 88 and 90 connected in this manner, the signals provided at the Q output terminals of the flip-flops exhibit a pulse repetition rate identical to the applied signals with the signals being synchronized to the CLK 1 signal since the CLK 1 signal is coupled to the clock terminals of each flip-flop.

To provide the direct sequence modulation signal, the arrangement of FIG. 5 includes a pseudo-noise generator 92 that is clocked by the ÷2 clock signal and a data generator 94 that is clocked by the ÷8 clock signal. Since data generator 94 is clocked at a rate that is one-fourth the clock rate of pseudo-noise generator 92, the depicted realization of the invention exhibits a chip rate of four chips/bit. To supply the pulse code modulated direct sequence signal, the data generated by pseudo-noise generator 92 and data generator 94 is modulo-2 added in adder circuit 96, with the direct sequence modulation signal being coupled to the input terminal of a four-bit parallel output shift register 100.

Shift register 100 is clocked by the ÷2 clock signal to supply a four-bit parallel format binary signal to the data inputs of a synchronous four-bit counter 104. Counter 104 is clocked by the system clock signal (CLK 1), which is coupled to the clock terminal of counter 104 via an inverter circuit 102. In addition, counter 104 is loaded by a signal that is supplied by a four-input NOR gate 106 via an inverter circuit 108. As shall be described in more detail relative to the timing diagram of FIG. 6, NOR gate 106 produces a single counter load pulse during each group of 16 CLK 2 pulses (when the CLK 2 clock signal, the ÷2 clock signal, the ÷4 clock signal and the ÷8 clock signal are simultaneously low). The logical negation of the counter load signal loads the four-bit digital word then stored in shift register 100 into counter 104. In addition, the counter load signal is connected to the J input terminal of a J-K flip-flop 110 that is clocked by the CLK 1 clock signal. The K input terminal of flip-flop 110 is connected to the output of a two-input AND gate 112 that is connected for receiving the carry signal from counter 104 and the logical negation of the counter load signal (supplied by an inverter circuit 108, which is connected to the output terminal of NOR gate 106. In view of the manner in which flip-flop 110 is connected, it can be recognized that the counter load signal causes the Q output of flip-flop 110 to go high as a four-bit data word stored in shift register 100 is loaded into counter 104. When counter 104 reaches a count of 16, a carry pulse is coupled to AND gate 112 which is enabled by the signal supplied by inverter circuit 108. Thus, the Q output of flip-flop 110 goes low when counter 104 reaches a count of 16. Since the Q output of flip-flop 110 remains high for the number of CLK 2 clock pulses that are required to counter between an initial value that is representative of four consecutive bits of the direct sequence signal (the four-bit signal supplied by shift register 100) and the counter capacity (16), the signal supplied at the Q output of flip-flop 110 is a pulse-duration modulation signal that is representative of the direct sequence signal.

The ÷8 clock signal is removed from the pulse-duration modulation signal in the same manner as was discussed relative to the prior art analog input circuit. That is, in the arrangement of FIG. 5, the Q output terminal of flip-flop 110 is connected to one input terminal of a modulo-2 adder 114 that has the second input terminal thereof connected for receiving ÷16 clock signal. The suppressed clock pulse-duration modulation signal is supplied to an output terminal 118 by modulo-2 adder 114 (via a buffer stage 116).

Figure 6:
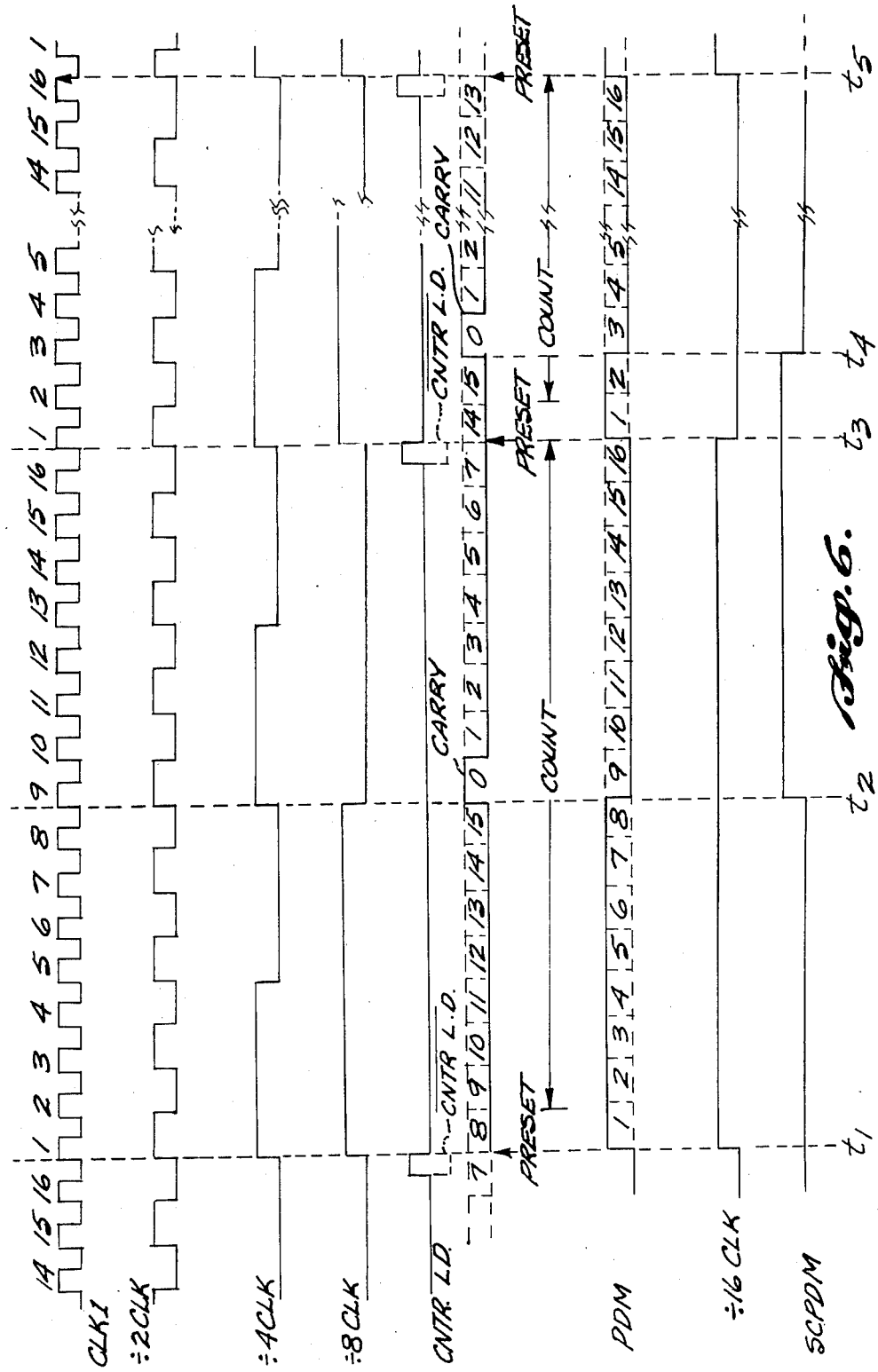
FIG. 6 illustrates a timing diagram that is useful in understanding the operation of the embodiment of the invention that is depicted in FIG. 5.

The operation of the suppressed clock pulse-duration modulation circuit of FIG. 5 can be better understood in view of the timing diagram of FIG. 6, which illustrates operation of the circuit to generate two pulses of a pulse-duration modulation signal (supplied at the Q output terminal of flip-flop 110) and, hence, one pulse of the suppressed clock pulse-duration modulation signal (supplied at terminal 118 in FIG. 5).

In the timing diagram of FIG. 6 the depicted CLK 2 clock signal, the ÷2 clock signal, the ÷4 clock signal and the ÷8 clock signal are all low immediately prior to time $t_1$. Thus, NOR gate 106 of FIG. 5 produces a positive signal (logic level high) until the next CLK 1 signal begins at $t_1$ of FIG. 6. The output of NOR gate 106, which is identified a the CNTR LD signal in FIG. 6, causes the pulse-duration modulation (PDM) signal to go high at time $t_1$ (occurrence of the next CLK 1 pulse) and, simultaneously causes the four-bit parallel format digital signal stored in shift register to be loaded into counter 104 (by application of the $\overline{\text{CNTR LD}}$ signal). In the example provided by FIG. 6, a four-bit digital signal having a decimal equivalent value of 8 is loaded into counter 104 at time $t_1$.

Each clock pulse supplied by the CLK 1 clock signal after time $t_1$ advances counter 104 until a count of 16 is reached and a carry pulse is generated (at time $t_2$ in FIG. 6). This sets the PDM signal low to complete one pulse of the PDM signal with the pulse width being equal to eight periods of the CLK 1 clock signal. Counter 104 then continues to count up from a count of zero until a second CNTR LD signal is generated by NOR gate 106 immediately prior to time $t_3$ in FIG. 6. In the example shown in FIG. 6, a count of fourteen is loaded into counter 96 at time $t_3$ with the PDM signal being set high by operation of flip-flop 110. Counter 104 then advances with each clock pulse supplied by the CLK 2 signal, until a count of sixteen is reached and a carry signal is geenrated (at time $t_4$ in FIG. 6). The carry pulse sets the PDM signal low and the counter of counter 104 continues to increment with each pulse of the CLK 1 clock signal until the sequence is repeated by the next occurrence of a CNTR LD signal (time $t_5$ in FIG. 6).

Referring to the ÷16 clock signal and the PDM signal in FIG. 6, it can be seen that when the PDM signal is added (modulo-2) with the ÷16 clock signal, a single pulse of the suppressed clock pulse-duration modulation signal (SCPDM) is generated. As is apparent from FIG. 6, the leading and trailing edges of the SCPDM pulse is synchronized with the trailing edges of the PDM pulses (thus exhibiting a pulse width equal to ten periods of the CLK 1 clock signal). Thus, the signal does not include the clock feature of the direct sequence signal.

Figure 7A:
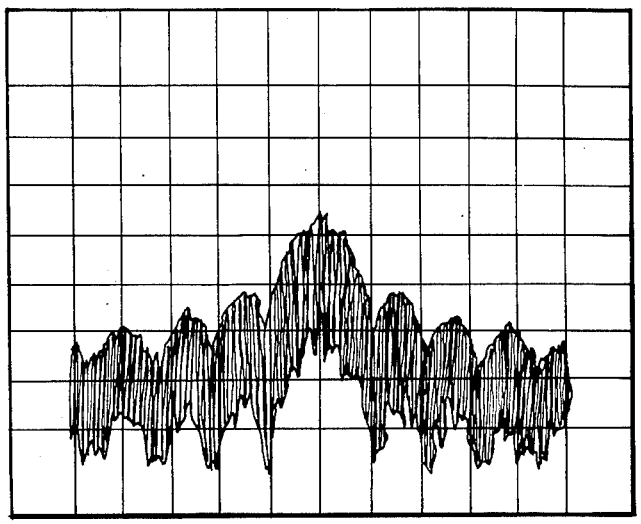
FIGS. 7A and 7B provide a comparison of the spectra of a conventional direct sequence modulation signal and the spectra of the suppressed clock pulseduration modulation signal of the invention, with FIG. 7A illustrating the conventional direct sequence modulation spectra and FIG. 7B depicting the output spectra of the suppressed clock pulse-duration modulation circuit of FIG. 5.
Figure 7B:
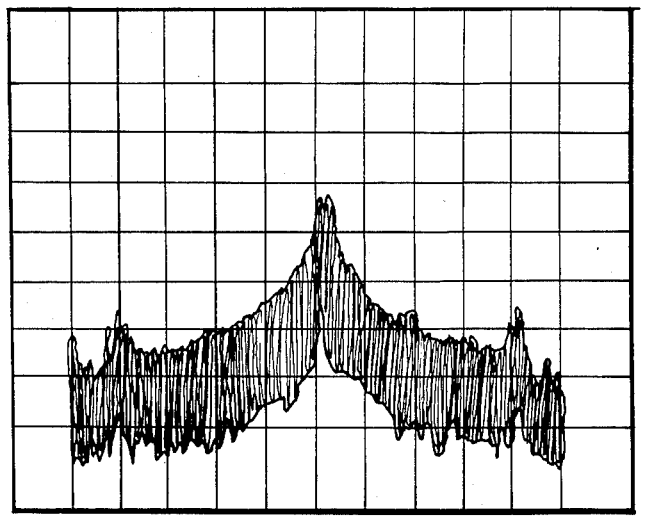

The nature of the suppressed clock pulse-duration signal can be appreciated in view of FIG. 7, which provides a comparison of the signal spectra for a conventional pseudo-noise direct sequence modulation signal and a digital suppressed clock pulse-duration modulation signal that is generated by the arrangement of FIG. 5. In particular, FIG. 7A illustrates the spectra for a conventional pseudo-noise direct sequence modulation signal wherein the pseudo-noise generator is clocked at a rate of 5 MHz. FIG. 7B illustrates the spectra for a suppressed clock pulse-duration modulation signal wherein the pseudo-noise code and clock rate are identical to the pseudo-noise code and clock rate (5 MHz) used in generating the spectra of FIG. 7A. In viewing FIG. 7 it can be noted that the spectra of FIG. 7A clearly includes the system clock feature, having a main lobe that exhibits a bandwidth of 10 MHz (twice the pseudo-noise clock rate) and side lobes that exhibit a bandwidth that is equal to the pseudo-noise generator clock rate. In contrast, the spectra for the suppressed clock pulse-duration modulation signal does not exhibit the (Sin x/x)² envelope, but smoothly decreases at frequencies less than the center frequency.

It will be recognized by those skilled in the art that various modifications and changes can be made in the embodiment of the invention disclosed herein without departing from the scope and the spirit of the invention. For example, it can be recognized that the circuit of FIG. 5 is to limited to depicted realization, but can be more generally characterized in that the width of each pulse of the pulse-duration modulation signal generated by the invention is between $NT/2^N$ and $NT$, with there being $NT/2^N$ increments; where T is the period of the pseudo-noise generator clock signal; N is the chip rate for the direct sequence signal; and the clock frequency for the counter employed being equal to $2^N/NT$. In addition, in view of the foregoing description, it can be recognized that the signal processing effected by the disclosed digital circuit realization of the invention is a synchronous sequential operation that can be implemented with a microprocessor or other programmed sequential machine. In this regard, the method that is implemented by the invention basically includes the steps of: (a) generating a direct sequence modulation signal by synchronously embedding a digital information signal in a binary code sequence that exhibits a clock rate equal to N times the clock rate of the digital information signal (N being a nonzero integer); (b) synchronously generating a pulse-duration modulation signal that includes a signal pulse for each set of consecutive N bits of the signal generated in step (a), with the time duration of each signal pulse being representative of the decimal equivalent value of each particular set of N consecutive bits; and (c) modulo-2 adding the pulse-duration modulation signal with a signal that is synchronized to the binary code sequence and exhibits a pulse repetition rate equal to one-half the clock rate of the digital information signal.

In the circuit arrangement disclosed herein, the pulse-duration modulation signal is generated by:

(a) repeatedly converting each said N consecutive bits of said direct sequence modulation signal to an N-bit digital word;

(b) generating a counting signal that exhibits a frequency of $2^N R_c/N$, where $R_c$ is the clock rate of the digital information signal;

(c) establishing a counting interval equal to $2^N$ periods of the counting signal;

(d) establishing for each counting interval an initial count that is equal to the value of the current N-bit digital word;

(e) counting the number of periods of the counting signal required to count between the initial count and a count of $2^N$; and (f) supplying a signal pulse of a duration equal to the number of periods of the counting signal required to count from the initial count to a count of $2^N$.

The embodiments of the invention in which an exclusive property or privilege is claimed are defined as follows:

1. A method for generating a suppressed clock pulse-duration modulation signal for a direct response spread spectrum transmission system comprising the steps of:
generating a direct sequence signal by synchronously combining a digital information signal with a binary code sequence, said binary code sequence having a clock rate of $NR_c$ where $R_c$ is the clock rate of said digital information signal and N is a non-zero integer that is greater than unity;
synchronously generating a pulse-duration modulation signal that includes a signal pulse for each consecutive set of N-bits of said direct sequence signal, the time duration of each pulse of said pulse-duration modulation signal being representative of the value of said set of N consecutive bits; and
modulo-2 adding said pulse-duration modulation signal with a signal that is synchronized to said binary code sequence and exhibits a pulse repetition rate of $R_c/2$.

2. The method of claim 1, wherein said step of synchronously combining said digital information signal with said binary code sequence comprises the step of modulo-2 adding said digital information signal to said binary code sequence.

3. The method of claim 1, wherein said step of synchronously generating said pulse-duration modulation signal comprises the steps of:
    (a) repeatedly converting each said N consecutive bits of said direct sequence modulation signal to an N-bit digital word;
    (b) generating a counting signal that exhibits a frequency of $2^N R_c/N$;
    (c) establishing a counting interval equal to $2^N$ periods of said counting signal;
    (d) establishing for each counting interval an initial count that is equal to the value of the current N-bit digital word;
    (e) counting the number of periods of said counting signal required to count between said initial count and a count of $2^N$; and
    (f) supplying a signal pulse of a duration equal to the number of periods of said counting signal required to count from said intitial count to said count of $2^N$.

4. A digital circuit for supplying a suppressed clock pulse-duration modulation signal for a direct sequence spread spectrum transmission system comprising:
    a digital data generator for supplying a digitally encoded sequential signal representative of the information to be transmitted by said spread spectrum transmission system, said digital data generator being responsive to an applied clock signal having a clock rate of $R_c$;
    a code sequence generator for supplying a code sequence in digital serial format, said code sequence generator being responsive to an applied clock signal having a clock rate equal to $NR_c$, where N is equal to $2^i$, i=1, 2, 3 . . . ;
    means for synchronously combining said digitally encoded sequential signal representative of the information to be transmitted with said code sequence generated by said code sequence generator to supply a direct sequence modulation signal;
    signal conversion means for converting said direct sequence modulation signal into a series of digital words, each said digital word including N consecutive bits of said direct sequence modulation signal;
    counting means responsive to each digital word of said series of digital words and responsive to an applied clock signal having a clock rate equal to $2^N/NT$, where T is the period of said clock signal applied to said code sequence generator, said counting means including means for estabishing an initial count equal to the value of each of said digital words, means for counting at said rate of $2^N/NT$ from said initial count to a count of $2^N$ and means for supplying a signal when said count of $2^N$ is reached;
    logic means responsive to said signal supplied by said counting means for supplying a pulse-duration modulation signal, said logic means including means for establishing the duration of each pulse of said pulse-duration modulation signal equal to the time required for said counting means to count from said initial count to said count of $2^N$; and
    modulo-2 addition means for supplying said suppressed clock pulseduration modulation signal, said modulo-2 addition means including means for synchronously adding said pulse-duration modulation signal with a pulse signal having a pulse repetition rate equal to $R_c/2$.

5. The digital circuit of claim 4, wherein said signal conversion means is an N-bit shift register and said counting means is a $2^N$-bit binary synchronous counter, the input terminal of said shift register being connected for receiving said direct sequence modulation signal, the data inputs of said $2^N$-bit binary synchronous counter being connected to the output terminals of said shift register, said digital circuit further comprising a timing circuit for supplying a signal to said $2^N$-bit synchronous binary counter for loading the digital word stored by said shift register into said synchronous counter as said initial count.

6. The digital circuit of claim 5, wherein said timing circuit futher includes means for supplying said applied clock signal to said code sequence generator, means for supplying said applied clock signal to said digital data generator, means for supplying said clock signal to said counter circuit, and means for supplying said pulse signal to said modulo-2 addition means.

7. The logic circuit of claim 5, wherein said logic means includes a J-K flip-flop circuit and a two input AND gate, the J input terminal of said J-K flip-flop circuit being connected for receiving a signal equal to logical 1 when said signal is supplied by said timing means for loading said counter, said signal supplied by said counter when said count of $2^N$ is reached being connected to one input terminal of said AND gate, the second terminal of said AND gate being connected for receiving a signal at logic level zero when said timing circuit supplies said signal to said counter for loading said initial count, the output terminal of said AND gate being connected to the K input terminal of said J-K flip-flop circuit, the Q output of said J-K flip-flop circuit being connected for supplying said pulse-duration modulation signal to said modulo-2 addition means, and the clock terminal of said J-K flip-flop circuit being connected for receiving said clock signal applied to said counter circuit.

8. The digital circuit of claim 6, wherein N is equal to 4.

9. A digital circuit for supplying a suppressed clock pulse-duration modulation signal for a direct sequence spread spectrum modulation system comprising:
    a digital data generator for supplying a digitally encoded sequential signal representative of the information to be transmitted by said spread spectrum transmission system, said digital data generator being responsive to an applied clock signal having a predetermined clock rate;
    a pseudo-noise generator for generating a sequential digital spectrum spreading signal, said pseudo-noise generator being responsive to an applied clock signal having a clock rate of four times the clock rate of said digital data generator;
    first modulo-2 addition means, said first modulo-2 addition means being connected for receiving the signals supplied by said pseudo-noise generator and said digital data generator, said first modulo addition means supplying a direct sequence code;
    a four-bit parallel output shift register, said shift register including an input terminal connected for receiving said direct sequence code, a clock terminal connected for receiving the clock signal supplied to said pseudo-noise generator and having four output terminals for supplying a four-bit digital word in parallel format;

a four-bit synchronous binary counter, said binary counter including data input terminals connected for receiving said four-bit digital word supplied by said shaft register, a carry terminal for supplying a carry signal when said binary counter reaches a count equivalent to 16, a load terminal responsive to an applied load pulse for loading the digital word supplied by said shift register into said counter as an initial count, and a clock terminal connected for receiving a clock signal having a clock rate equal to four times the clock rate of said clock signal supplied to said pseudo-noise generator;

a two-input AND gate, the first input terminal of said AND gate being connected for receiving said carry signal supplied by said binary counter, the second input terminal of said AND gate being connected for receiving said load pulse supplied to said binary counter;

a J-K flip-flop, said J-K flip-flop including a clock terminal connected for receiving said signal supplied to said clock terminal of said binary counter, a K input terminal connected to the output terminal of said two-input AND gate and a J input terminal connected for receiving a logic 1 signal in time coincidence with said load pulse supplied to said binary counter;

second modulo-2 addition means, said second modulo-2 addition means having a first input terminal connected to the Q output of said J-K flip-flop and having a second input terminal connected for receiving a signal that exhibits a pulse repetition rate equal to one-half the clock rate of said clock signal supplied to said digital data generator, said second modulo-2 addition means having an output terminal connected for supplying said suppressed clock pulse-duration modulation signal; and a timing circuit responsive to said clock signal supplied to said binary counter, said timing circuit including means for supplying said clock signal to said pseudo-noise generator, said clock signal to said digital data generator, said pulse signal to said second modulo-2 addition means and said load pulse to said binary counter.

10. The digital circuit of claim 9, wherein said timing circuit includes means for supplying a first additional clock signal which is synchronized to said clock signal supplied to said pseudo-noise generator and which exhibits a clock rate of twice the clock rate of the clock rate of said clock signal supplied to said pseudo-noise generator; means for supplying a second additional clock signal which is synchronized to said clock signal supplied to said pseudo-noise generator and which exhibits a clock rate of one-half the clock rate of said clock signal supplied to said pseudo-noise generator; and a four-input NOR gate having the input terminals thereof connected for receiving said first and second additional clock signals, said clock signal supplied to said pseudo-noise generator and said clock signal supplied to said digital data generator, the output terminal of said four-input NOR gate being connected for supplying said load signal to said binary counter.

* * * * *

UNITED STATES PATENT AND TRADEMARK OFFICE
CERTIFICATE OF CORRECTION

PATENT NO. : 4,669,089

DATED : May 26, 1987

INVENTOR(S) : Gahagan et al.

Page 1 of 2

It is certified that error appears in the above-identified patent and that said Letters Patent is hereby corrected as shown below:

| | |
|---|---|
| Column 2, Line 54, | "clock-pulse-duration" should be --clock pulse-duration-- |
| Column 4, Line 41, | "synchronizd" should be --synchronized-- |
| Column 5, Line 32, | "pulseduration" should be --pulse-duration-- |
| Column 5, Line 49, | "pseudonoise" should be --pseudo-noise-- |
| Column 6, Line 19, | "pas" should be --pass-- |
| Column 6, Line 65, | "module-2" should be --modulo-2-- |
| Column 7, Line 31, | "funtions" should be --functions-- |
| Column 7, Line 49, | "flip-flop" should be --flip-flops-- |
| Column 8, Line 65, | "a" should be --as-- |
| Column 9, Line 20, | "geenrated" should be --generated-- |
| Column 9, Line 65, | "to" should be --not-- (first occurrence) |
| Column 10, Line 51, (Claim 1, Line 2) | "response" should be --sequence-- |
| Column 11, Line 53, (Claim 4, Line 29) | "estabishing" should be --establishing-- |

UNITED STATES PATENT AND TRADEMARK OFFICE
CERTIFICATE OF CORRECTION

PATENT NO. : 4,669,089

DATED : May 26, 1987

INVENTOR(S) : Gahagan et al.

It is certified that error appears in the above-identified patent and that said Letters Patent is hereby corrected as shown below:

Column 11, Line 67, "pulseduration" should be --pulse-duration--
(Claim 4, Line 43)

Column 13, Line 6, "shaft" should be --shift--
(Claim 9, Line 30)

Column 13, Line 27, "logic" should be --logical--
(Claim 9, Line 51)

Column 13, Line 32, insert --terminal-- after "output"
(Claim 9, Line 56)

Signed and Sealed this

Ninth Day of February, 1988

Attest:

DONALD J QUIGG

Attesting Officer

Commissioner of Patents and Trademarks